United States Patent [19]
Black et al.

[11] 3,793,905
[45] Feb. 26, 1974

[54] GAS TURBINE STARTING AND AUXILIARY TURNING MECHANISM

[75] Inventors: James B. Black, Roscoe; Bradford K. Shull, Rockford, both of Ill.

[73] Assignee: Twin Disc Incorporated, Racine, Wis.

[22] Filed: Aug. 14, 1972

[21] Appl. No.: 280,441

[52] U.S. Cl............................... 74/661, 74/720
[51] Int. Cl............................................ F16h 37/06
[58] Field of Search...... 74/661, 720, 665 A, 665 B, 74/665 C, 665 D, 665 E; 60/6, 39.14

[56] References Cited
UNITED STATES PATENTS

| 3,388,684 | 6/1968 | Gros et al. | 74/661 |
| 2,888,841 | 6/1959 | Pevas | 74/720 |
| 3,683,719 | 8/1972 | Gros | 74/661 |
| 3,465,162 | 9/1969 | Oprecht | 60/39.14 |
| 2,511,039 | 6/1950 | Black et al. | 74/720 |

FOREIGN PATENTS OR APPLICATIONS

| 613,920 | 2/1961 | Canada | 74/661 |

*Primary Examiner*—Benjamin W. Wyche
*Assistant Examiner*—Allan Russell Burke
*Attorney, Agent, or Firm*—James E. Nilles

[57] ABSTRACT

A double input-single output power transmitting mechanism is utilized to accelerate the rotor of a gas turbine from standstill to initial operating speed, and to continue rotation of the rotor at slow speed during cooling after fuel shut-off. A friction clutch transmits both the starting torque and the slow speed turning torque to the turbine rotor.

7 Claims, 5 Drawing Figures

GAS TURBINE STARTING AND AUXILIARY TURNING MECHANISM

BACKGROUND OF THE INVENTION

The invention relates to power transmitting mechanisms, and it is concerned more particularly with a mechanism for accelerating the rotor of a gas turbine to its initial operating speed, and with a mechanism for turning the turbine rotor at a relatively slow speed after fuel shut-off.

Large gas turbines are used in the electrical power generating industry to supply electrical energy during the time of peak power consumption. This generally means that the gas turbine unit is operated for 3 to 5 hours 5 days per week. In addition, the gas turbine can be started much more quickly than a steam turbine power generator. Also, since the gas turbine driven generating unit does not require steam condensing equipment, it is possible to locate these units at scattered locations, enhancing their usefulness in emergency situations.

In order to start the gas turbine, its rotor must first be accelerated from standstill to 10 or 20 percent speed before it is fired and to between 40 and 60 percent speed before it can sustain itself and accelerate up to operating speed, within reasonable time and temperature limits.

The other requirement, that is, the turning of the turbine rotor after fuel shut-off is indispensable, particularly for large turbines. When power is no longer required from the gas turbine and it is shut down, the rotor cannot be allowed to stop in one position and then remain there for a long period. The reason for this is that if the rotor is not turned, it will warp due to uneven cooling and will lock in the stator housing with subsequent damage to bladed elements. A turning gear is therefore needed and has heretofore been provided to keep the rotor turning while cooling so that it cools evenly and remains aligned properly. Ordinarily, this turning gear on the larger units is kept running continuously while the turbine is shut down.

During the past, the requirement for a high initial and subsequently decreasing starting torque has been taken care of by means of conventional mechanisms including a hydraulic torque converter. Likewise, it has heretofore been customary to provide for continued turning of the turbine rotor after fuel shut-off, particularly in electrical power plants using large gas turbines, by means of a separate auxiliary drive mechanism and an associated jaw clutch.

SUMMARY OF THE INVENTION

Generally, it is an object of the invention to provide an integrated power transmitting mechanism for starting a gas turbine and turning its rotor at slow speed during cooling after fuel shut-off.

More specifically, it is an object of the invention or provide an integrated power transmitting mechanism which is selectively operable to either transmit starting torque from a relatively powerful motor through a torque converter to an output shaft of the mechanism or to transmit slow turning speed to the same output shaft from a less powerful auxiliary motor.

A further object of the invention is to provide an integrated power transmitting mechanism of the above mentioned character which permits resumption of an aborted turbine start without waiting for the turbine rotor to coast to a complete standstill.

A further object of the invention is to provide an integrated power transmitting mechanism of the above mentioned character which may readily be adapted for use in power plants which generate electrical energy at different network frequencies, such as the 60 cycle frequency prevalent in the United States, and the 50 cycle frequency prevalent in other countries.

A further object of the invention is to provide an integrated power transmitting mechanism which may readily be adapted for use with different types of power sources to supply the required starting torque, for instance a diesel engine, or an electric motor operating at a different speed than the diesel engine.

A further object of the invention is to provide an integrated power transmitting mechanism of the above mentioned character wherein the horsepower absorption of the torque converter may readily be varied by means of gear trains affording different gear ratios, in order to absorb a wide range of input and output torque requirements without the need for torque converters of many different sizes.

A further object of the invention is to provide an integrated power transmitting mechanism of the mentioned character wherein the converter output speed and torque can readily be changed to different values in order to match specific requirements of the gas turbine, particularly as to starting time.

These and other objects and advantages of the present invention appear hereinafter as this disclosure progresses, reference being had to the accompanying drawings.

THE DRAWINGS

DESCRIPTION OF A PREFERRED EMBODIMENT

Figure 1:
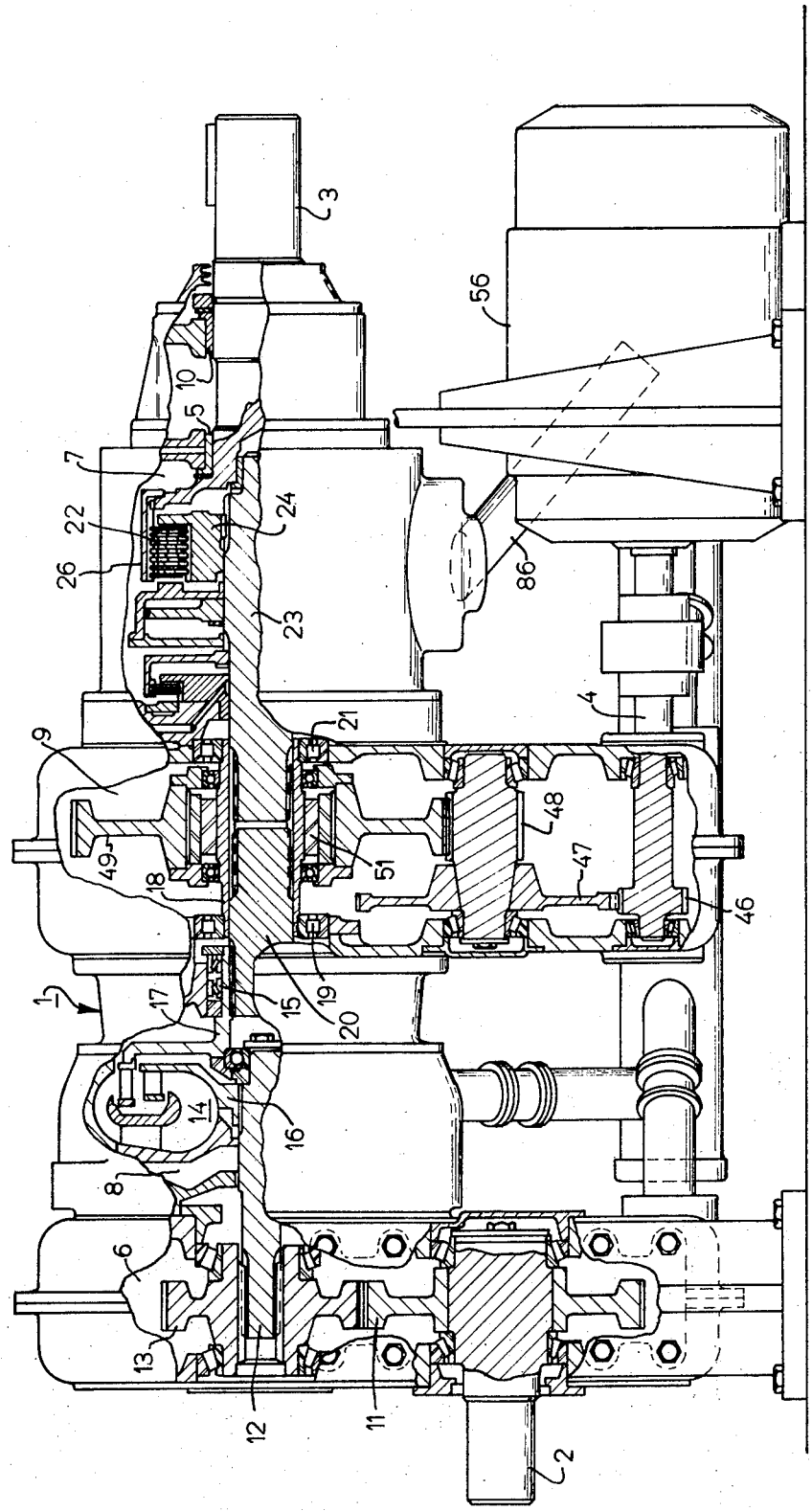
FIG. 1 is an elevational side view with parts broken away, of an integrated power transmitting mechanism embodying the invention.
Figure 2:
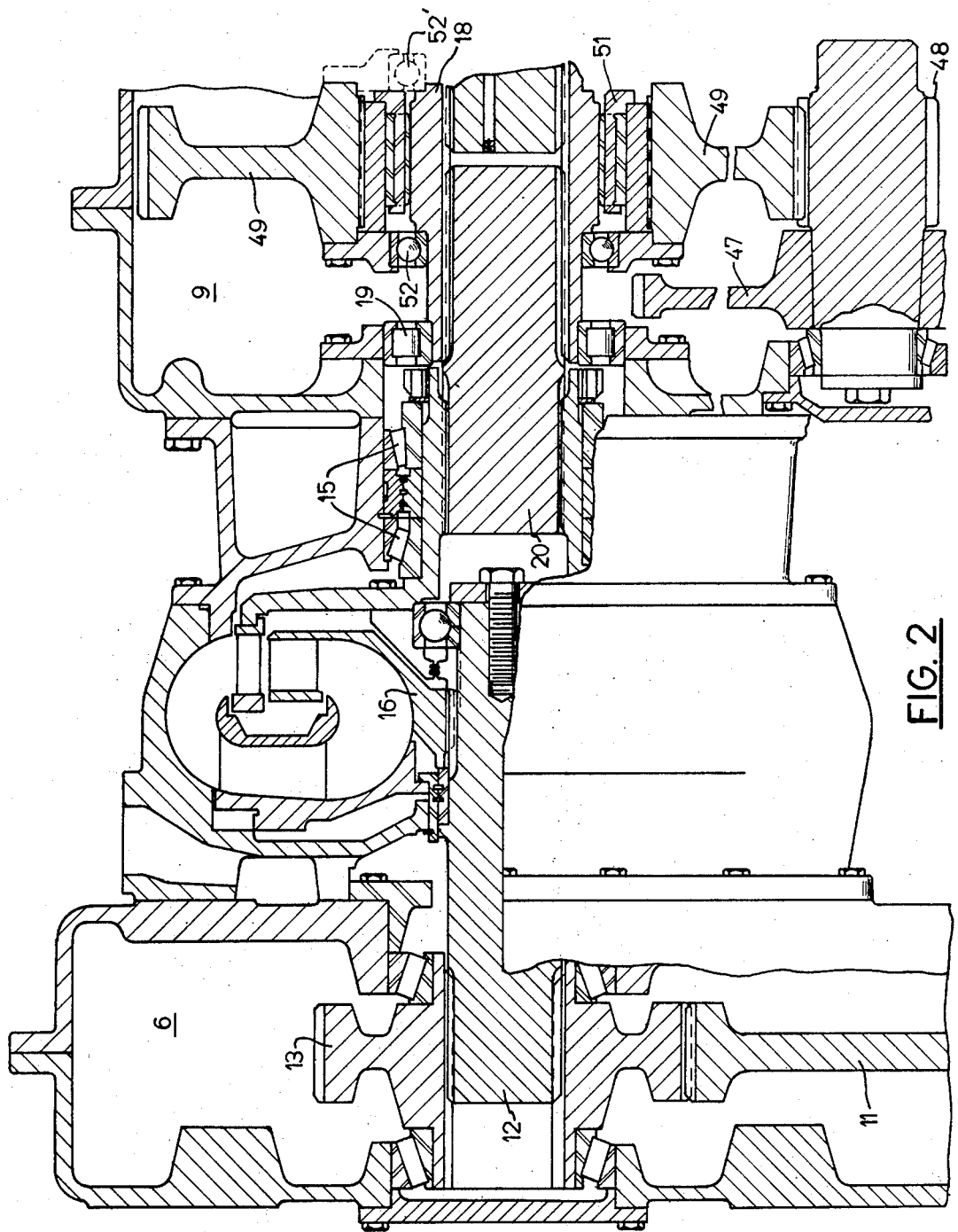
FIG. 2 is an enlarged view of parts shown in the left part of FIG. 1.
Figure 3:
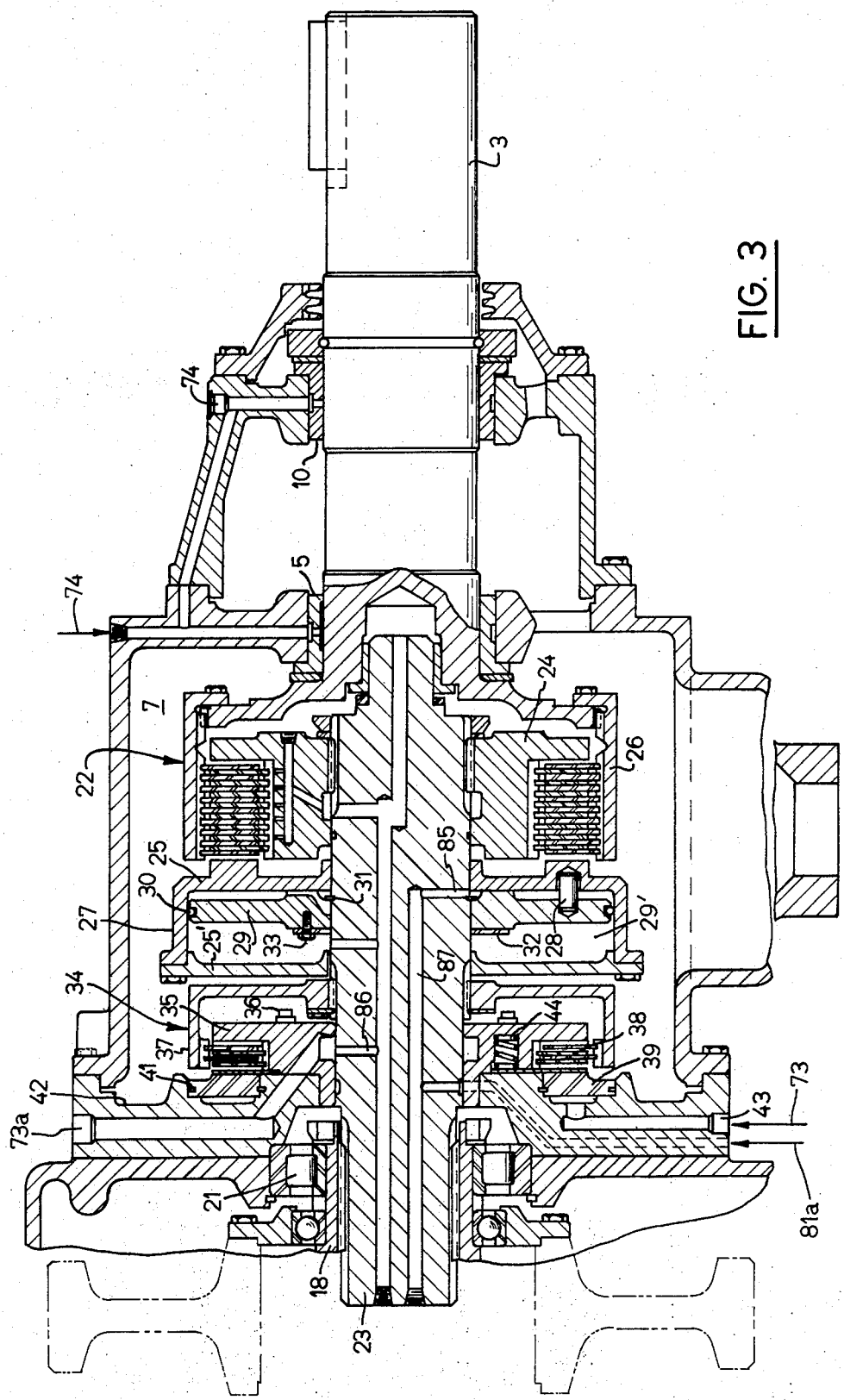
FIG. 3 is an enlarged view of parts shown in the right half of FIG. 1.

The power transmitting mechanism shown in FIG. 1 is an integrated unit and comprises a housing 1; a main power input shaft 2 at one end of the housing; a power output shaft 3 at the other end of the housing; main power transmitting means connecting the input shaft 2 with the output shaft 3; an auxiliary power input shaft 4, and one-way drive establishing connecting means operatively interposed between the auxiliary power input shaft 4 and the main power transmitting means between the shafts 2 and 3. The housing 1 is internally partitioned into an input gear compartment 6 at one end, a clutch compartment 7 at the other end, and adjoining intermediate compartments 8 and 9, the intermediate compartment 8 lying next to the input gear compartment 6, and the intermediate compartment 9 lying next to the clutch compartment 7. The main power transmitting means comprise an input gear 11 on the input shaft 2, a driven shaft 12 spaced transverly from the shaft 2 and mounting a gear 13 in mesh with the gear 11. The main power transmitting means further comprise a hydraulic torque converter 14 within the intermediate housing compartment 8, the pump impeller 16 of the converter being connected to the driven shaft 12, and the runner or output shaft 17 of the converter being supported in the housing 1 by a pair of taper roller bearings 15 and connected by means of a splined coupling shaft 20 to a hollow intermediate main drive transmitting shaft 18 which extends through the intermediate housing compartment 9 and is supported therein by roller bearings 19 (FIG. 2) and 21 (FIG. 3). The main power transmitting means further comprise a disconnect clutch 22 within the clutch compartment 7 of the housing 1, the clutch 22 being operatively interposed between the intermediate drive shaft 18 and the output shaft 3 by means of a clutch input shaft 23. The output shaft 3 is supported in sleeve bearings 5 and 10.

As best shown in FIG. 3, the clutch 22 is a multiple disc type friction clutch and comprises driving and driven torque transmitting disc elements which are spline connected, respectively, with a hub 24 on the shaft 23 and with a drum 26 carried by the output shaft 3, the driving and driven discs of the clutch being movable into and out of frictional engagement with each other. An actuating mechanism for the clutch 22 comprises a circular thrust housing 27 which is shiftably mounted on the clutch input shaft 23, an abutment disc 29 which extends radially of the shaft 23 between the end walls 25, 25' of the housing 27 and is secured in an axially fixed position on the shaft 23 by a snap ring 31 and a retainer plate 32. The retainer plate is seated in a circumferential groove of the shaft 23 and secured to the disc 29 by a circumferential series of cap screws 33. An O-ring 30 in the outer periphery of the disc 29 bears against the interior cylindrical wall of the housing 27 and seals the space between the disc 29 and the housing wall 25 from the space between the disc and the housing wall 25'. Pressure fluid to engage the clutch 22 is admitted into the space between the disc 29 and the housing wall 25 from a bore 87 in the shaft 23 as will be described more fully hereinbelow. One or more dowel pins 28 secure the disc 29 and housing 29 against relative rotation.

Also mounted on the clutch input shaft 23 is a brake mechanism 34 for immobilizing the shaft 23 while the clutch 22 is disengaged and the output shaft 3 is being rotated by operating machinery connected thereto. The brake mechanism 34 comprises a stationary central hub assembly 35 which is secured to the housing 1 by a circumferential series of cap screws 36; a drum 37 which is spline connected to the shaft 23; and a stack 38 of stationary and rotating brake discs which are spline connected, respectively, with the hub 35 and the drum 37. The brake discs are axially shiftable relative to each other, and are movable into frictional engagement with each other by means of an annular piston 39 which is axially reciprocable within an annular recess 41 in a radial partition 42 of the housing 1. A radial bore 43 of the partition 42 communicates with the recess 41 for the admission of pressure fluid by means of which piston 39 may be forced against the brake discs 38 when it is desired to immobilize the shaft 23. A circular series of coil springs 44 are mounted in the hub assembly 35 and react upon radial extensions of the annular piston 39 in order to release the brake 34 when the clutch 22 is engaged.

The one-way drive establishing connecting means between the auxiliary power input shaft 4 and the main power transmitting means are enclosed in the intermediate housing compartment 9 next to the clutch compartment 7. The auxiliary power input shaft 4 is journalled in the housing compartment 9 on an axis which is spaced transversely from the intermediate main drive transmitting shaft 18. A speed reducing gear train is operatively interposed between the auxiliary power input shaft 4 and the intermediate drive transmitting shaft 18 and comprises a small diameter pinion 46 on the shaft 4; a large diameter intermediate gear 47 in mesh with the pinion 46; a small diameter intermediate gear 48 fixedly connected coaxially with the gear 47, a large diameter gear 49 coaxial with the shaft 18, and a cam-roller clutch 51 affording a one-way driving connection between the gear 49 and the shaft 18. The gear 49 is rotatably supported on the shaft 18 by two ball bearings 52, 52', and the cam-roller clutch 51 comprises a radially outer cam member secured to the gear 49, a radially inner race member which is a part of shaft 18 and a circumferential series of clutch rollers between the cam and race members, the construction and operation of the clutch conforming with well-known engineering principles.

Figure 4:
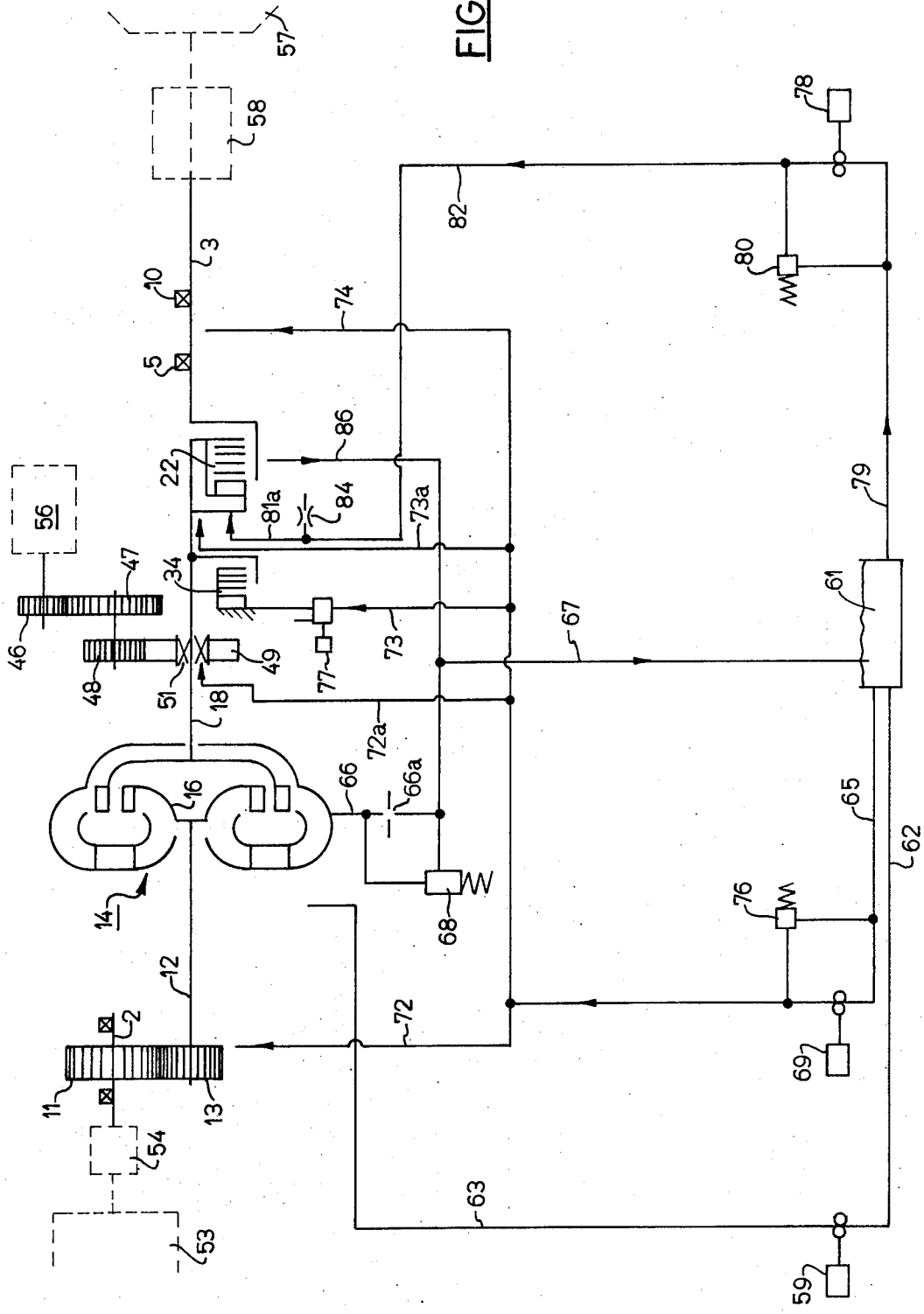
FIG. 4 is a diagram schematically showing the power transmitting mechanism of FIG. 1 connected to a gas turbine and to power and cooling oil supply sources.

FIG. 4 illustrates a typical installation of the power transmitting mechanism of FIG. 1 in an electric power plant. A starting motor symbolically indicated by the reference character 53 is connected to the main input shaft 2 by a coupling 54. An auxiliary motor 56 is connected to the drive pinion 46, and the rotor of a gas turbine symbolically indicated by the reference character 57 is connected to the output shaft 3 by a coupling 58. A converter charge pump 59 draws oil from a sump 61 through a suction line 62 and delivers it to the converter 14 through a supply line 63. From the converter the oil is returned to sump 61 by dump line 66 through orifice 66a and pressure regulator 68 connecting to return line 67. Filling the converter and dumping is accomplished merely by starting pump 59 and turning it off.

A lubricating pump 69 draws oil from the sump 61 through a suction line 65 and delivers it to branch lines 72, 72a, 73, 73a and 74 which are connected, respectively, to the input train 11, 13 to gear train 49, 48, 47, 46, to disc brake 34, to disc clutch cooling, and to sleeve bearings 5 and 10 of the output shaft 3. An overload relief valve 76 connects the output of pump 69 with the suction line 65. The branch line 73 to the disc brake 34 is controlled by a solenoid operated valve 77.

A pump 78 (FIG. 4) is connected to the sump 61 by a suction line 79, and at its discharge side the pump 78 is connected by supply line 82 with an oil inlet opening 81a (FIG. 3) and bore 85 communicates with the clutch engaging chamber for clutch 22. A bleed restrictor 84 provides a backflow oil path so clutch can disengage when clutch pump 78 is turned off, and return line 67 has a branch 86 connected to clutch cavity 7.

The oil inlet 73a communicates with the chamber 29' between wall 25' and the piston 29 to provide clutch disengagement force and also communicates with the clutch plates of clutch 22 for cooling therefor, and communicates with the chamber formed between the shafts 23 and 3. The clutch 22 is engaged and disengaged merely by starting and stopping pump 78. An overload relief valve 80 connects the output of pump 78 with the suction line 79.

The sequence of operations for starting the gas turbine 57 in FIG. 4 is as follows: First, establish oil pressure by operation of pump 69 and close the branch line 73 by the solenoid valve 77 to keep the brake 34 released; second, engage the clutch 22 by starting pump 78; third, mobilize starting motor 53; fourth, fill torque converter by operation of pump 59; fifth, obtain turbine sustaining speed; sixth, dump torque converter through line 66 by stopping pump 59; seventh, disengage clutch 22 by stopping pump 78; eighth, apply brake by opening solenoid valve 77; and ninth, stop starting motor 53.

The sequence of operations for turbine shut down are as follows. First, take the turbine generator (not shown) off the network; second, let the turbine coast down to a speed of say 400 RPM, start pump motor 78 to engage clutch 22 and keeping brake 34 disengaged; third, mobilize the auxiliary motor 56; fourth, after the turbine has coasted down to turning speed and driving connection between the auxiliary motor 56 and the output shaft 3 has been automatically established by operation of the over-running clutch 51, leave the auxiliary motor 56 energized for as long as required for even cooling of the turbine.

The input gear train 11, 13, may be readily modified to take care of various input torque and input speed requirements, and also to adapt the mechanism for operation in power plant feeding networks of different frequencies, as for instance 60 cycles or 50 cycles.

The use of the friction clutch 22 instead of a jaw clutch has the advantage that if a start is aborted for some reason, the turbine and connected electrical generator do not have to coast to zero speed before the clutch can be re-engaged. That means a saving of start-up time in cases where a start had to be aborted after the clutch has been disengaged.

Figure 5:
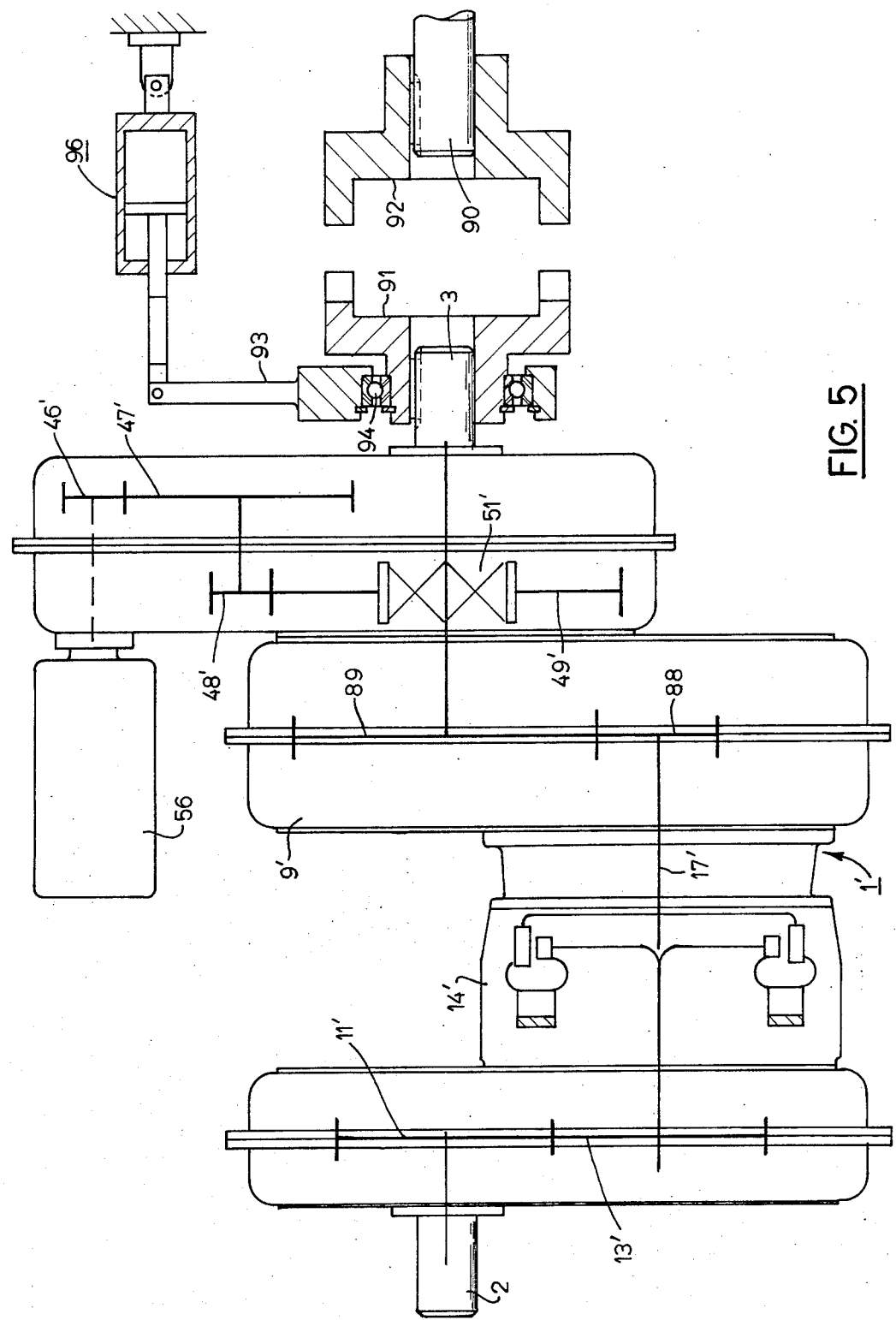
FIG. 5 is an elevational side view of a modified power transmitting mechanism embodying the invention.

The modified power transmitting mechanism shown in FIG. 5 is generally similar to the one shown in FIG. 1 in that it comprises an input gear train 11', 13', a hydraulic torque converter 14', and a one-way drive establishing connection between and an auxiliary motor 56 and the output shaft 3 by means of a double reduction gear train 46', 47', 48', 49', and an over-running clutch 51'. In addition to the input gear train 11', 13', the modified mechanism shown in FIG. 5 includes an output gear train between the torque converter 14' and the output shaft 3. The output gear train is enclosed in an intermediate section 9' of the integrated housing 1' and comprises a small diameter driving gear 88 connected with the torque converter runner shaft 17', and a large diameter driven gear 89 in mesh with the gear 88 and connected with the output shaft 3. A jaw clutch for connecting the output shaft 3 to the shaft 90 of a gas turbine or other driven machine comprises a driving clutch section 91 shiftably splined on the shaft 3, a driven clutch section 92 keyed to the shaft 90, a shift collar 93 mounted by means of a ball bearing 94 on the clutch section 91, and a hydraulic actuating cylinder assembly 96 for the shift collar 93.

The provision of the output gear train 88, 89 readily permits changing of the converter output speed and torque to different values so as to match specific requirements of the gas turbine, particularly with respect to starting time.

We claim:

1. A power transmitting mechanism for starting a gas turbine and turning its rotor at slow speed during the cooling period after fuel shut-off, said mechanism comprising a main power input shaft adapted for connection to a power source; main drive transmitting means comprising a hydraulic torque converter connected at its input side in driven relation with said main power input shaft, and a disconnect clutch having driving torque transmitting means connected with the output side of said torque converter and driven torque transmitting means adapted for connection with said turbine rotor, said disconnect clutch being in axial alignment with said torque converter and said transmitting means; an auxiliary power input shaft adapted for connection with another power source; and one-way drive establishing connecting means operatively interposed between said auxiliary power input shaft and said main drive transmitting means, said one-way drive establishing means being in axial alignment with and between said torque converter and said disconnect clutch.

2. A power transmitting mechanism as set forth in claim 1 wherein said main drive transmitting means includes an intermediate shaft connecting and in axial alignment with the output element of said torque converter with the driving element of said disconnect clutch; and wherein said one-way drive establishing connecting means are operatively interposed between said intermediate shaft and said auxiliary power input shaft.

3. A power transmitting mechanism as set forth in claim 2 wherein said disconnect clutch comprises driving and driven torque transmitting elements movable into and out of frictional engagement with each other.

4. A power transmitting mechanism as set forth in claim 3 and further comprising releasable brake means operatively associated with said intermediate shaft for immobilizing the latter upon disengagement of said disconnect clutch.

5. A power transmitting mechanism comprising a housing partitioned into an input gear compartment at one end, a clutch compartment at the other end, and adjoining intermediate compartments, one adjacent said input gear compartment, and the other adjacent said clutch compartment; a speed changing main power input gear train enclosed within said input gear compartment and including parallel but spaced apart driving and driven shafts; a hydraulic torque converter enclosed within the intermediate compartment next to said input gear compartment and connected in driven relation with said driven shaft of said main power input gear train; an intermediate main drive transmitting shaft connected coaxially with said torque converter and extending through said other intermediate housing compartment; an auxiliary power input shaft journalled in said other intermediate housing compartment on an axis spaced from but parallel to said intermediate main drive transmitting shaft; a speed reducing gear train including an over-running clutch connecting said auxiliary power input shaft in one-way drive establishing relation with said intermediate shaft; a power output shaft extending from said clutch compartment, and a disconnect clutch operatively interposed within said clutch compartment between said intermediate and power output shafts.

6. A power transmitting mechanism as set forth in claim 5 and further comprising a releasable brake mechanism within said clutch compartment and comprising stationary brake means fixedly mounted within said clutch compartment and complementary brake means connected with said intermediate shaft for rotation therewith and in axially shiftable relation thereto.

7. A power transmitting mechanism comprising, a hydraulic torque converter, a main power input shaft rotatable on an axis parallel to but spaced from the impeller axis of said torque converter; a gear train connecting said main power input shaft with the impeller of said torque converter; power output gearing comprising a drive shaft connected in driven relation with the runner of said torque converter, a driven shaft parallel to but spaced from said drive shaft, and speed reducing gearing between said drive and driven shafts; an auxiliary power input shaft; and one-way drive establishing connecting means operatively interposed between said auxiliary power input shaft and said driven shaft, said one-way drive establishing connecting means comprising a drive pinion on said auxiliary power input shaft; a large diameter intermediate gear in mesh with said drive pinion and a small diameter intermediate gear fixedly connected coaxially with said large diameter intermediate gear, a large diameter driven gear rotatably supported on said driven shaft and meshing with said small diameter intermediate gear; and an overrunning clutch operatively interposed between said large diameter driven gear and said driven shaft.

* * * * *